(12) United States Patent
Sato et al.

(10) Patent No.: US 7,478,729 B2
(45) Date of Patent: Jan. 20, 2009

(54) FUEL-FILTERING DEVICE

(75) Inventors: Hiroji Sato, Tokyo (JP); Kazumasa Kurihara, Fujisawa (JP); Yasutomo Kobayashi, Yamato (JP); Toshihide Kimisawa, Yokohama (JP); Takeshi Kojima, Kawasaki (JP)

(73) Assignee: Nifco Inc., Yokohama (JP)

( * ) Notice: Subject to any disclaimer, the term of this patent is extended or adjusted under 35 U.S.C. 154(b) by 380 days.

(21) Appl. No.: 11/057,236

(22) Filed: Feb. 15, 2005

(65) Prior Publication Data

US 2005/0150826 A1 Jul. 14, 2005

Related U.S. Application Data

(63) Continuation-in-part of application No. 10/190,601, filed on Jul. 9, 2002, now abandoned.

(30) Foreign Application Priority Data

Jul. 16, 2001 (JP) .............................. 2001-215668
Jul. 27, 2001 (JP) .............................. 2001-228295

(51) Int. Cl.
*B01D 29/46* (2006.01)
*B01D 29/13* (2006.01)
*B01D 35/027* (2006.01)

(52) U.S. Cl. .................... 210/491; 210/172.4; 210/317; 210/416.4; 210/461; 210/463; 210/490

(58) Field of Classification Search ... 210/172.1–172.6, 210/315–317, 416.4, 461, 486, 491, 499, 210/455, 460, 463, 483, 490
See application file for complete search history.

(56) References Cited

U.S. PATENT DOCUMENTS

| | | | | | |
|---|---|---|---|---|---|
| 4,312,753 | A | * | 1/1982 | Bell | 210/250 |
| 5,120,434 | A | * | 6/1992 | Yoshida | 210/172.4 |
| 5,395,520 | A | * | 3/1995 | Ito et al. | 210/172.4 |
| 5,409,608 | A | * | 4/1995 | Yoshida et al. | 210/315 |
| 5,547,568 | A | * | 8/1996 | Sasaki | 210/172.4 |
| 5,607,578 | A | * | 3/1997 | Ohkouchi et al. | 210/172.4 |
| 5,716,522 | A | * | 2/1998 | Chilton et al. | 210/317 |
| 5,902,480 | A | * | 5/1999 | Chilton et al. | 210/317 |
| 5,928,507 | A | * | 7/1999 | Chiga | 210/172.4 |
| 6,451,205 | B1 | * | 9/2002 | McGaw, Jr. | 156/73.3 |
| 6,464,872 | B1 | * | 10/2002 | Honda | 210/416.4 |

(Continued)

FOREIGN PATENT DOCUMENTS

JP 09010503 A * 1/1997

*Primary Examiner*—Duane S Smith
*Assistant Examiner*—Robert A Clemente
(74) *Attorney, Agent, or Firm*—Manabu Kanesaka

(57) ABSTRACT

A fuel-filtering device is disposed inside a fuel tank for filtering a fuel. The fuel-filtering device includes a filter body having a bag shape and a communication hole, and is formed of a plurality of laminated filter layers. The laminated filter layers includes an outside filter layer formed of a woven mesh, an inside filter layer formed of a non-woven fabric, and at least one intermediate filter layer disposed between the outside filter layer and the inside filter layer and formed of a non-woven fabric. The filter body is formed of at least one of a polyethylene fiber and a polypropylene fiber and has mesh sizes decreasing from the outside filter layer toward the inside filter layer.

10 Claims, 14 Drawing Sheets

U.S. PATENT DOCUMENTS 6,471,072 B1 * 10/2002 Rickle et al. ............... 210/486
6,613,227 B2 * 9/2003 Rickle ....................... 210/243
2004/0251194 A1 * 12/2004 Brzozowski et al. ..... 210/416.4
2005/0061723 A1 * 3/2005 Matsushita ................. 210/171

* cited by examiner

FUEL-FILTERING DEVICE

CROSS REFERENCE TO RELATED APPLICATION

This is a continuation-in-part application of patent application Ser. No. 10/190,601 filed on Jul. 9, 2002.

BACKGROUND OF THE INVENTION AND RELATED ART STATEMENT

The present invention relates to a fuel-filtering device attached to a fuel suction port located in a fuel tank.

A fuel pump transfers fuel in a fuel tank to an internal combustion engine via a suction pipe provided inside the fuel tank. In order to remove water from the transferred fuel as well as to prevent foreign materials from being sent to the fuel pump, a filter is attached to a fuel suction port of the suction pipe.

This type of filter has been disclosed in Japanese Patent Publication (KOKAI) No. 2000-246026. The filter is formed in a bag shape, and has an outer layer made of an extruded mesh and an inner layer made of a non-woven fabric. Also, a spacing member is provided inside the filter for maintaining an inflated bag shape of the filter.

According to the filter described above, water can be separated by the outer layer to a certain degree, and the inner layer can remove the foreign materials, such as dust, fiber pieces, peeled plating pieces, and solder grounds.

It is known that water can be separated more efficiently as a mesh of the filter becomes finer. However, in the conventional filter, there is a limit to make a mesh finer since the outer layer is made of the extruded mesh.

Also, a lower section of the filter contacts an inner surface at a lower section of a fuel tank. Therefore, when the fuel tank expands due to a change in an internal pressure, the spacing member is pressed and moved. When the spacing member is moved, the spacing member slides and contacts the inner layer.

In the conventional filter, the inner layer tends to be worn out with time. Also, small pieces may be fallen off from the filter due to the sliding contact, and these pieces may be sent to the internal combustion engine from the fuel suction port.

Accordingly, an object of the invention is to provide a fuel-filtering device with improved water separation efficiency.

Another object of the invention is to provide a fuel-filtering device with a spacing member for maintaining an inflated bag shape, and small pieces fallen off from the filter due to the sliding contact between the spacing member and the fuel tank are eliminated.

Further objects and advantages of the invention will be apparent from the following description of the invention.

SUMMARY OF THE INVENTION

To achieve the aforementioned objects, the first aspect of the invention provides a fuel-filtering device including a filter body formed in a bag shape. The fuel-filtering device is attached to a fuel suction port inside a fuel tank such that an inner space of the filter body communicates with the fuel suction port. The filter body is formed of two or more laminated filter layers. In the two or more laminated filter layers, the first filter layer constituting an outer surface of the filter body is formed of a woven mesh, and has a function of water separation. The second filter layer is formed of a non-woven fabric, and disposed adjacent to the woven mesh at an inner side of the woven mesh.

According to the structure of the filtering device of the first aspect of the invention, since the first filter layer is formed of the woven mesh having a fine mesh for improved water separation, water is separated more effectively in the inner space of the filter body as compared with an extruded mesh made of a synthetic resin.

Also, foreign materials in the fuel, which have passed through the first filter layer, can be effectively removed by the second filter layer, which is formed of the non-woven fabric and disposed just inside the first filter layer. Accordingly, since the number of foreign materials sent in the fuel pump is decreased, the fuel pump has a prolonged life.

According to the second aspect of the invention, a fuel-filtering device is formed of a filter body in a bag shape and a spacing member arranged in the filter body to maintain an inflated bag form. The fuel-filtering device is attached to the fuel suction port such that an inner space of the filter body communicates with the fuel suction port. The filter body includes an upper surface section and a lower surface section, and at least the lower surface section of the filter body includes an inner layer formed of a mesh and an outer layer formed of a non-woven fabric.

According to the structure of the filtering device of the second aspect of the invention, even if the spacing member is pressed and moved when the inner wall surface of the lower section of the fuel tank moves (that is, expansion and shrinking of the fuel tank) due to a change in an internal pressure of the fuel tank, the spacing member does not make direct sliding contact with the outer layer. Thus, the outer layer is not worn out with time, and fibers are not fallen off from the non-woven fabric. Accordingly, the fibers from the non-woven fabric are not sent to the internal combustion engine from the fuel suction port.

According to the third aspect of the invention, a fuel-filtering device is formed of a filter body in a bag form, and a spacing member arranged in the filter body to maintain an inflated bag form. The filter body includes an upper surface section and a lower surface section, and at least lower surface section of the filter body includes an inner layer formed of a mesh or mesh member, an outer layer formed of a mesh or mesh member, and an intermediate layer formed of a non-woven fabric.

According to the structure of the filtering device of the third aspect of the invention, even if the spacing member is pressed and moved when the inner wall surface of the lower section of the fuel tank moves (that is, expansion and shrinking of the fuel tank) due to a change in an internal pressure of the fuel tank, the spacing member does not make direct sliding contact with the outer layer. Thus, the outer layer is not worn out with time, and fibers are not fallen off from the non-woven fabric. Accordingly, the fibers from the non-woven fabric are not sent to the internal combustion engine side from the fuel suction port.

Also, since the intermediate layer formed of the non-woven fabric is sandwiched between the outer layer and the inner layer formed of the mesh, the shape of the non-woven fabric constituting the intermediate layer can be maintained by the outer layer and the inner layer, so that the filter body is maintained in an adequately inflated bag form.

Further, according to the fourth aspect of the invention, the fuel-filtering device according to the second aspect of the invention may further include a cylindrical socket body having two end portions. One end portion of the cylindrical socket body is connected to the fuel suction port, and the other end portion of the cylindrical socket body is connected to a communication hole formed in the filter body.

According to the structure of the filtering device of the fourth aspect of the invention, by connecting one end portion of the cylindrical socket body to the fuel suction port, the filtering device can be adequately attached to the fuel suction port.

Further, according to the fifth aspect of the invention, the fuel filtering-device according to the second aspect of the invention may further include a plastic contact section, which is integrally formed at an outer surface of the lower section of the filter body and contacts the inner wall surface of the lower section of the fuel tank.

According to the structure of the fuel-filtering device of the fifth aspect of the invention, the outer layer constituting the filter body is prevented from directly contacting the inner wall surface of the lower section of the fuel tank. Therefore, the outer layer will not be worn out with time since the inner wall surface of the lower section of the fuel tank does not slide against the outer layer when the inner wall surface of the lower section of the fuel tank moves (that is, when the fuel tank T is expanded or shrunk) due to the change in the internal pressure of the fuel tank.

According to the sixth aspect of the invention, the bag-shaped filter body of the fuel-filtering device of the second aspect of the invention may be formed of two filter base materials including the mesh constituting the inner layer and the non-woven fabric constituting the outer layer, respectively. The bag-shaped filter body is formed by connecting rim portions of the filter base materials. Alternatively, the filter body may be formed by folding the filter base material in half, in which the rim portions of the folded filter material face each other at portions other than the folded side, and are connected to each other to thereby make the filter body in the bag form. Then, the fuel-filtering device of the sixth aspect of the invention further includes a plastic cylindrical socket body, which has one end portion connected to the fuel suction port and the other end portion connected to the communication hole formed in the filter body. The cylindrical socket body is formed by insert molding by inserting the filter base material before connecting the rim portions as described above.

According to the structure of the filtering device of the sixth aspect of the invention, the filter base material and the cylindrical socket body are securely connected, in other words, the filter body formed of the filter base material and the cylindrical socket body are securely connected.

According to the seventh aspect of the invention, the filtering device of the sixth aspect of the invention may further include a plastic contact section formed at the outer surface of the lower section of the filter body. The plastic contact section contacts the inner wall surface of the lower section of the fuel tank. The contact section is formed by insert molding by inserting the filter base material before connecting the rim portions.

According to the structure of the filtering device of the seventh aspect of the invention, the filter base material and the plastic contact section are securely connected, in other words, the filter body formed of the filter base material and the contact section are securely connected.

According to the eighth aspect of the invention, in the filtering device according to the second aspect of the invention, the filter body may be formed by connecting the rim portions of the folded filter base material or two base materials as in the sixth aspect of the invention, wherein the mesh constituting the inner layer and the non-woven fabric constituting the outer layer include the same type of synthetic fibers.

According to the structure of the filtering device of the eighth aspect of the invention, the outer layer and the inner layer can be securely integrated at the rim portions connected by welding.

According to the ninth aspect of the invention, the bag-shaped filter body of the filtering device of the third aspect of the invention may be formed of two filter base materials including the mesh constituting the inner layer, the mesh constituting the outer layer, and the non-woven fabric constituting the intermediate layer. The bag-shaped filter body is formed by connecting rim portions of the filter base materials. Alternatively, the filter body may be formed by folding the filter base material in half, in which the rim portions of the folded filter material face each other at portions other than the folded side, and are connected to each other to thereby form the filter body in the bag form. The fuel-filtering device further includes a plastic cylindrical socket body, which has one end portion connected to the fuel suction port and the other end portion connected to the communication hole formed in the filter body. The cylindrical socket body is formed by insert molding by inserting the filter base material before connecting the rim portions as described above.

According to the structure of the filtering device of the ninth aspect of the invention, the filter base material and the cylindrical socket body are securely connected, in other words, the integration of the filter body formed of the filter base material and the cylindrical socket body are securely connected.

Further, according to the tenth aspect of the invention, the filter body of the filtering device of the third aspect of the invention may be formed by connecting the rim portions of the folded filter base material or two filter base materials as in the ninth aspect of the invention, and the filtering device further may include a plastic contact section integrally formed at the outer surface of the lower section of the filter body. The plastic contact section is formed by insert molding by inserting the filter base material before connecting the rim portions.

According to the structure of the filtering device of the tenth aspect of the invention, the filter base material and the contact section are securely connected, in other words, the integration of the filter body formed of the filter base material and the contact section are securely connected.

According to the eleventh aspect of the invention, the filter body of the filtering device of the third aspect of the invention may be formed by connecting the rim portions of the folded filter base material or two filter base materials as in the ninth aspect of the invention, and the mesh constituting the inner layer, the mesh constituting the outer layer and the non-woven fabric constituting the intermediate layer include the same type of synthetic fibers.

According to the structure of the eleventh aspect of the invention, the outer layer, the inner layer, and the intermediate layer can be securely integrated at the rim portions connected by welding.

DETAILED DESCRIPTION OF PREFERRED EMBODIMENTS

Hereunder, embodiments of the present invention will be explained with reference to the accompanied drawings. FIG. 1 to FIG. 11 show a filtering device F according to the first embodiment of the invention, and FIG. 12 to FIG. 15 show a filtering device F' according to the second embodiment of the invention.

Figure 1:
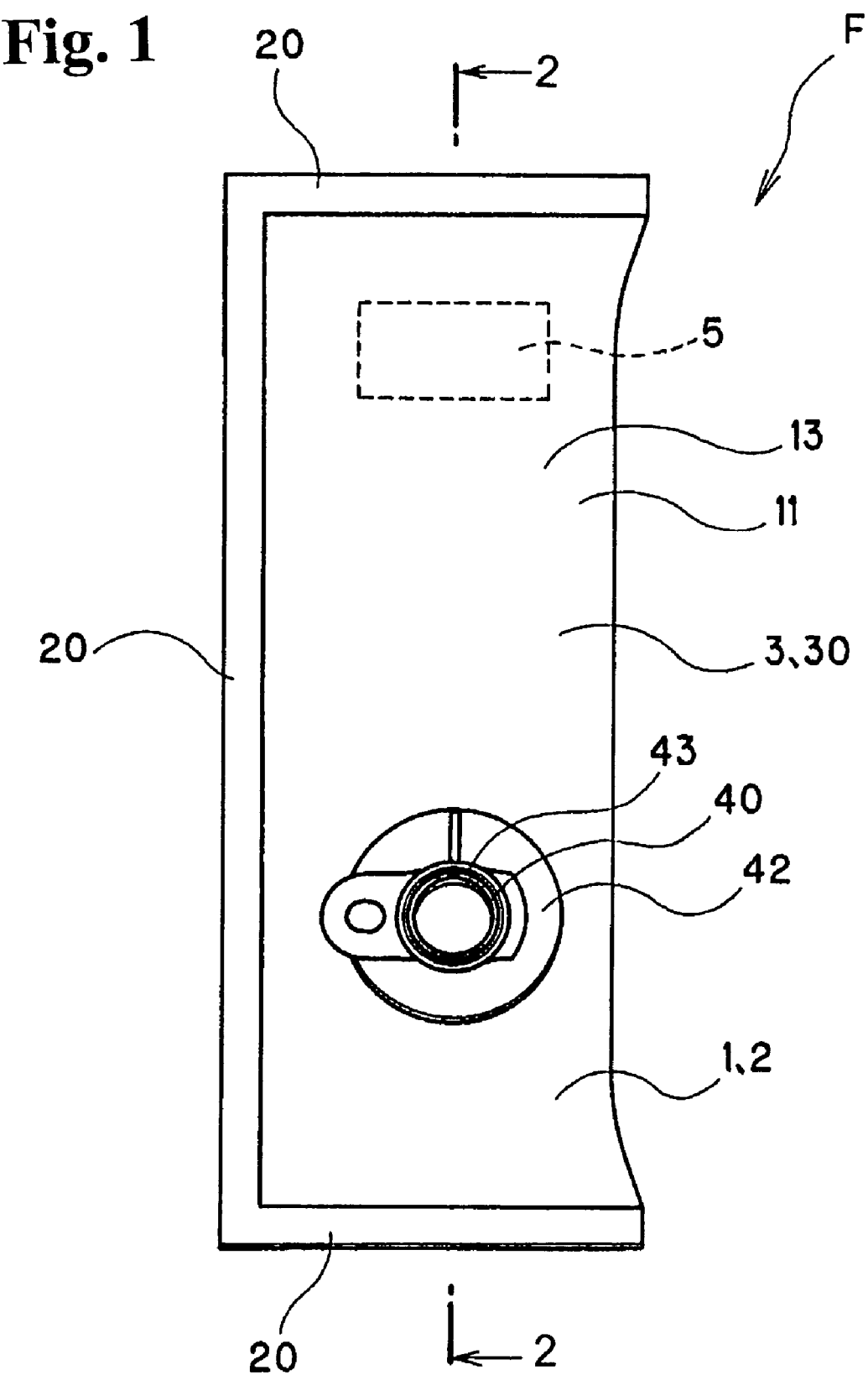
FIG. 1 is a plan view of a filtering device according to the first embodiment of the invention.
Figure 2:
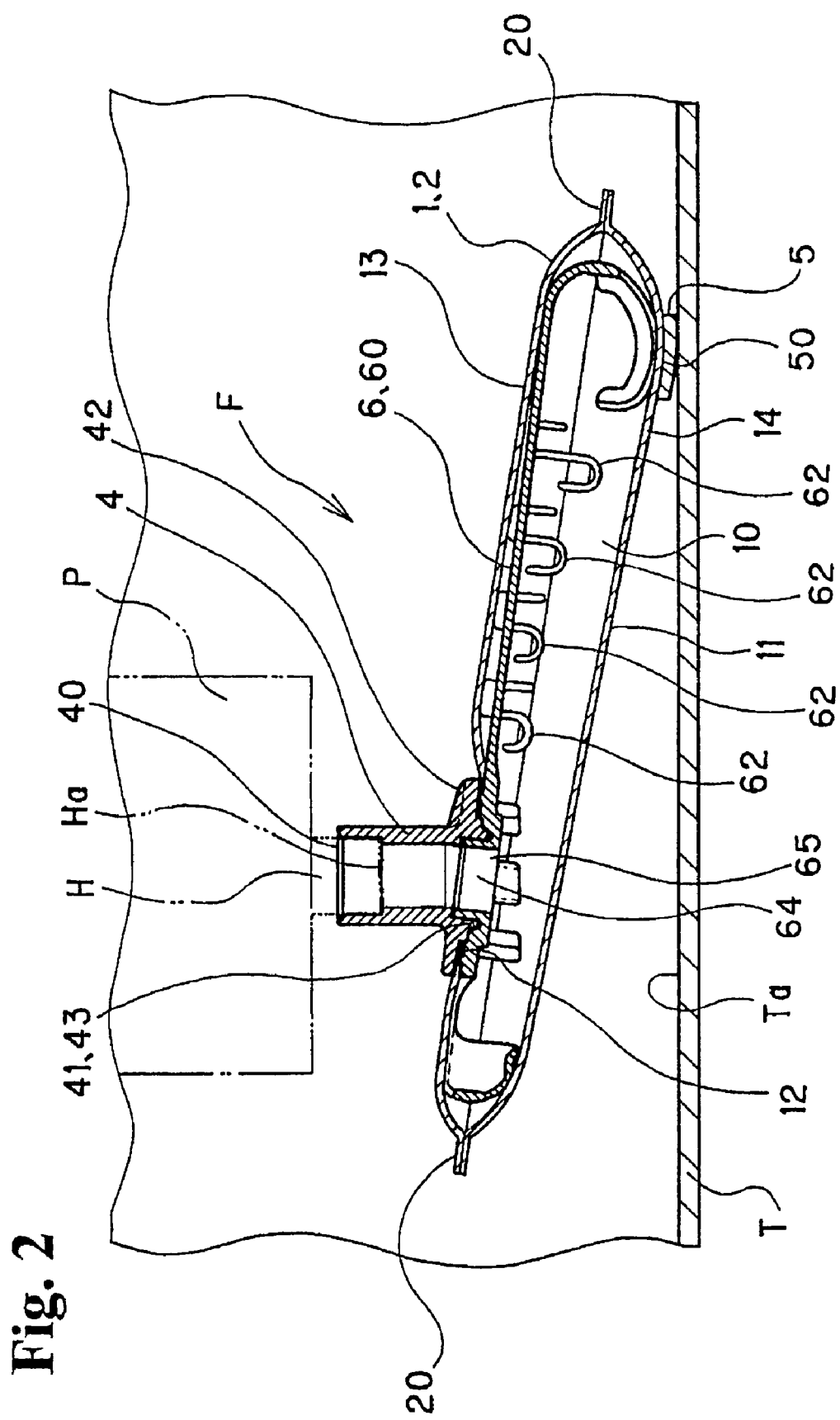
FIG. 2 is a sectional view of the filtering device taken along line 2-2 in FIG. 1 in a state that the filtering device is in use.
Figure 3:
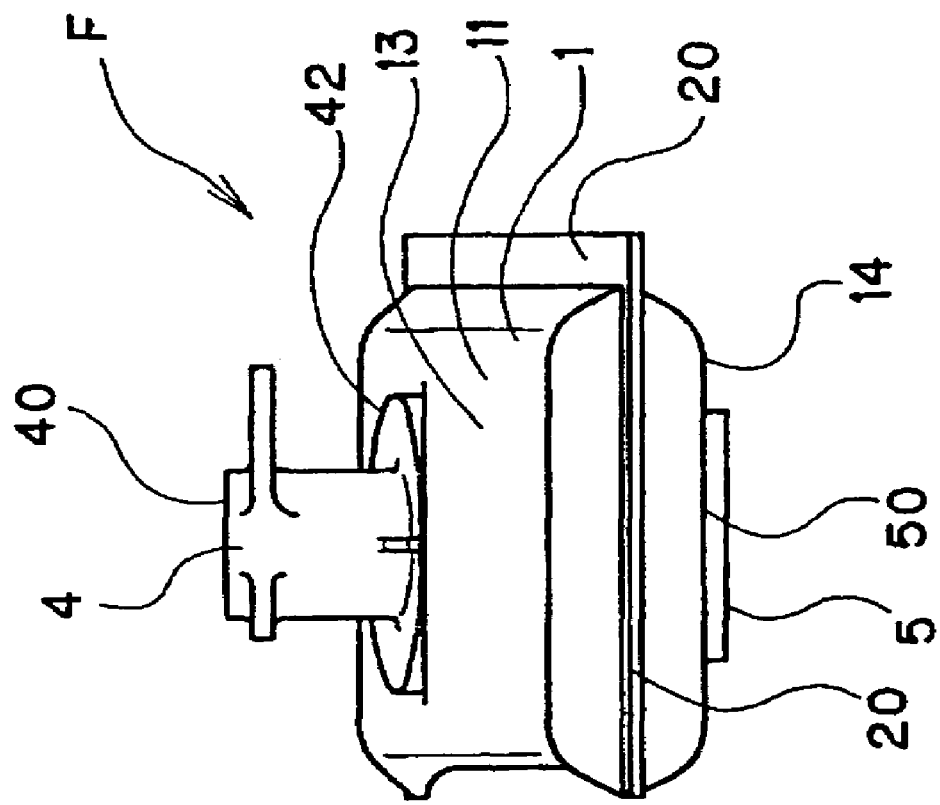
FIG. 3 is a side view of the filtering device.
Figure 4A:
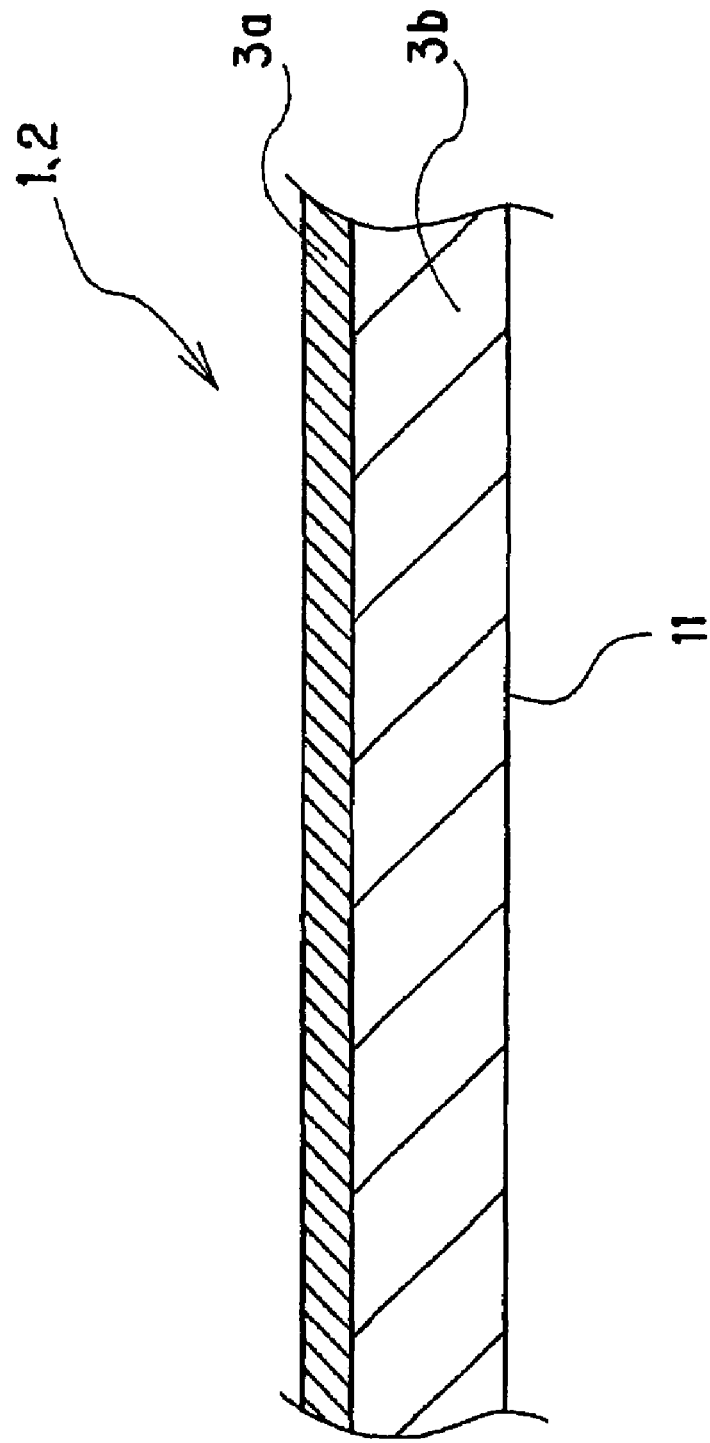
FIG. 4A is an enlarged sectional view of a filter body.
Figure 4B:
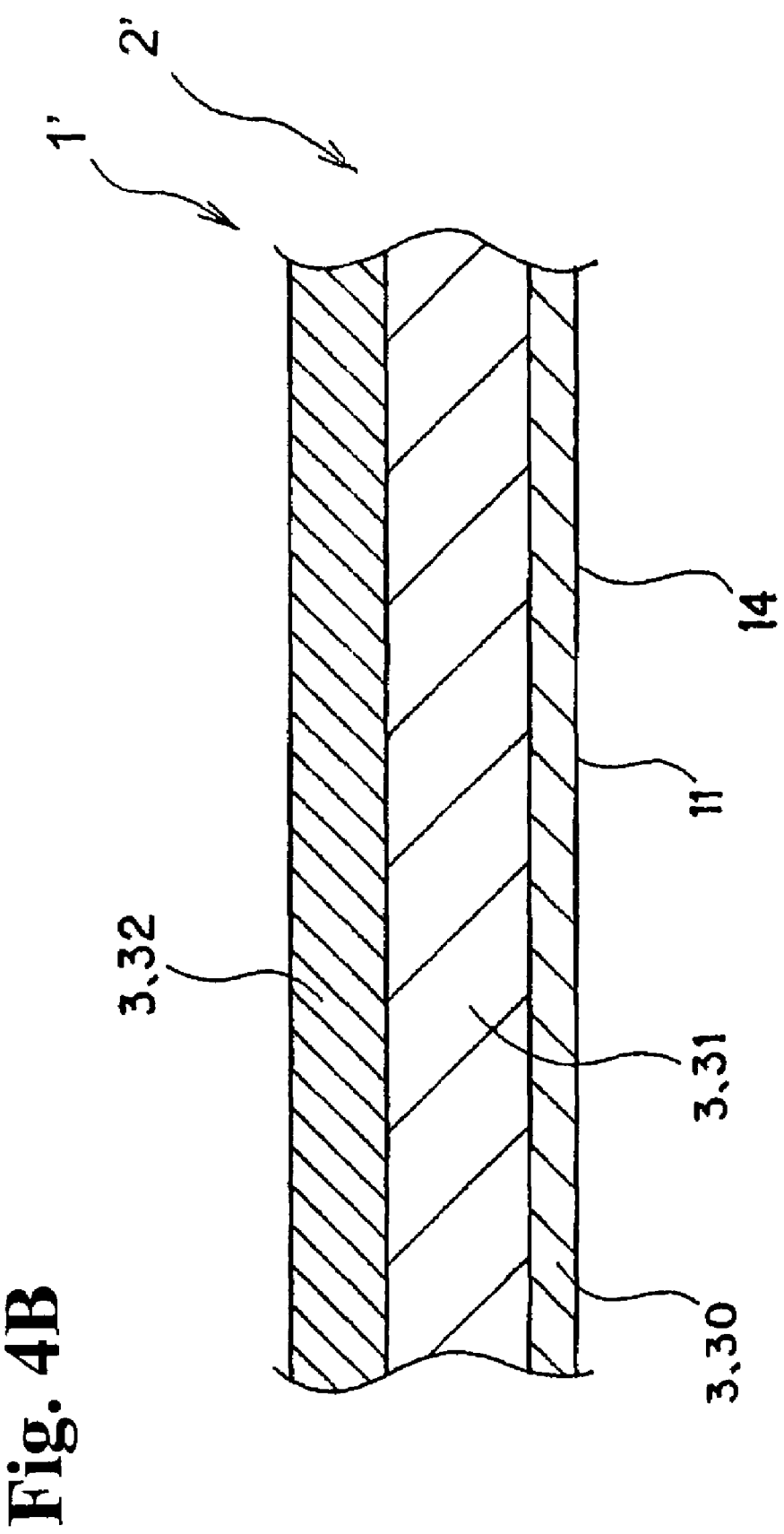
FIG. 4B is an enlarged sectional view of another filter body.
Figure 5:
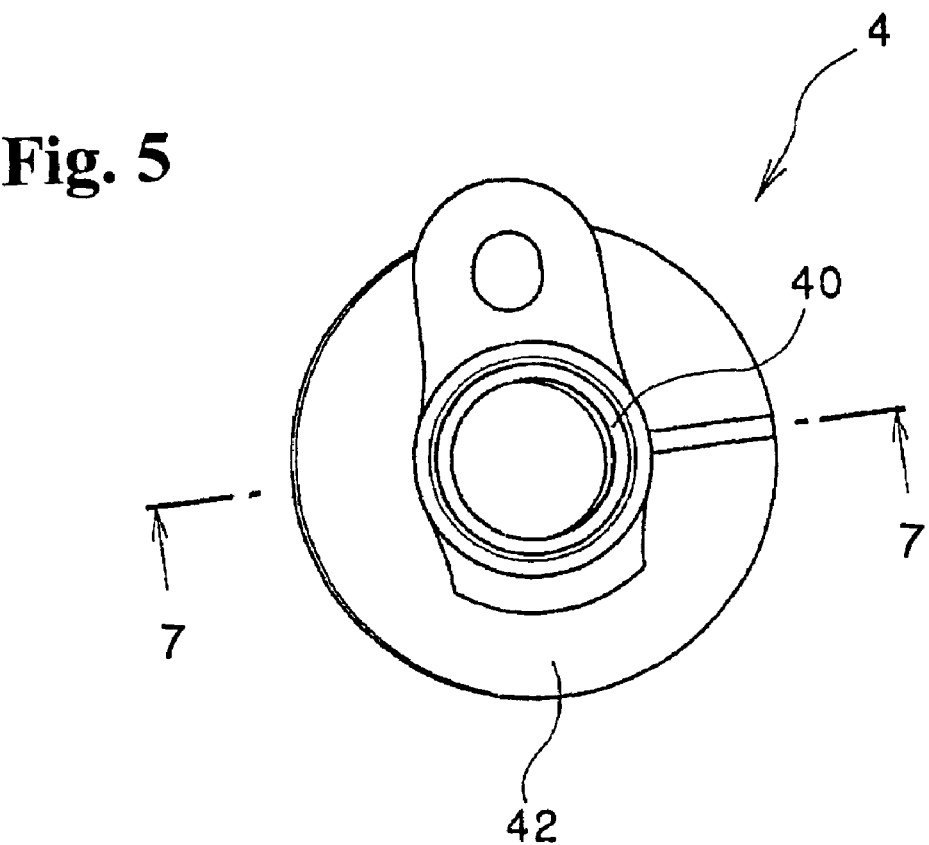
FIG. 5 is a top plan view of a cylindrical socket body.
Figure 6:
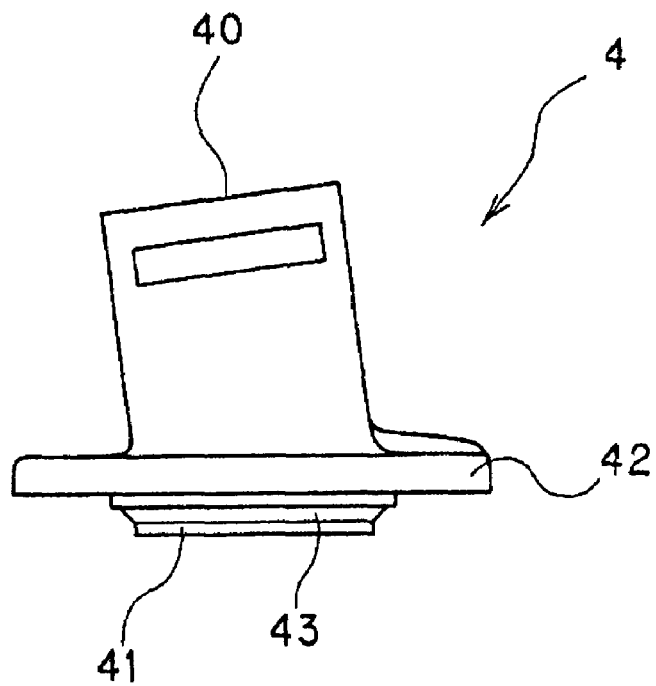
FIG. 6 is a side view of the cylindrical socket body.
Figure 7:
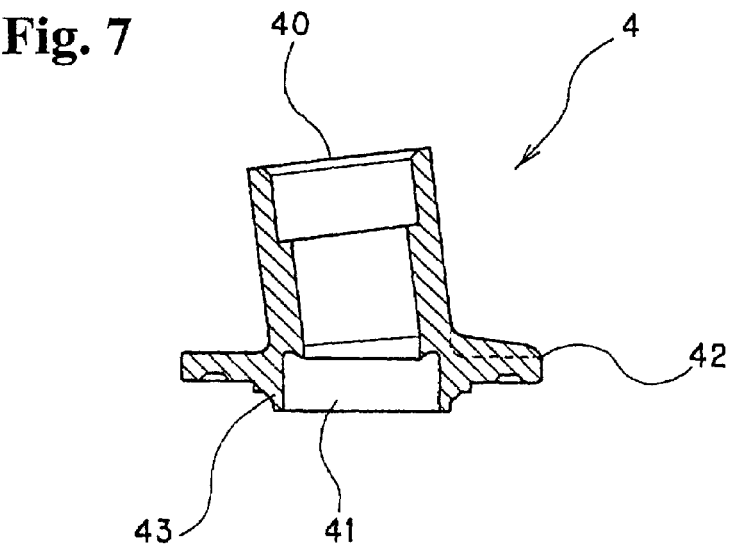
FIG. 7 is a sectional view taken along line 7-7 in FIG. 5.
Figure 8:
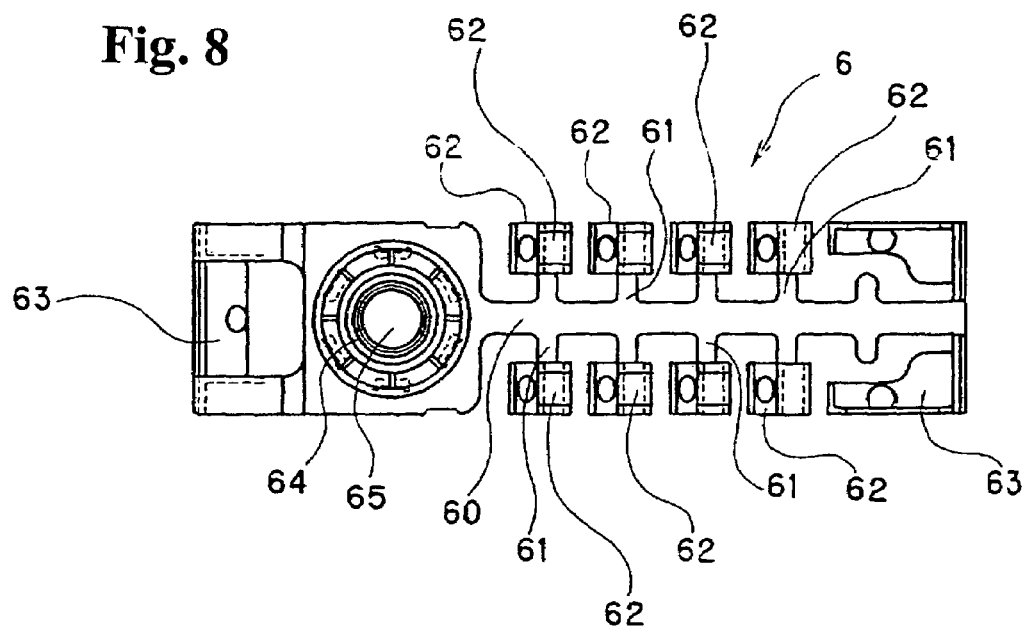
FIG. 8 is a top plan view of a spacing member.
Figure 9:
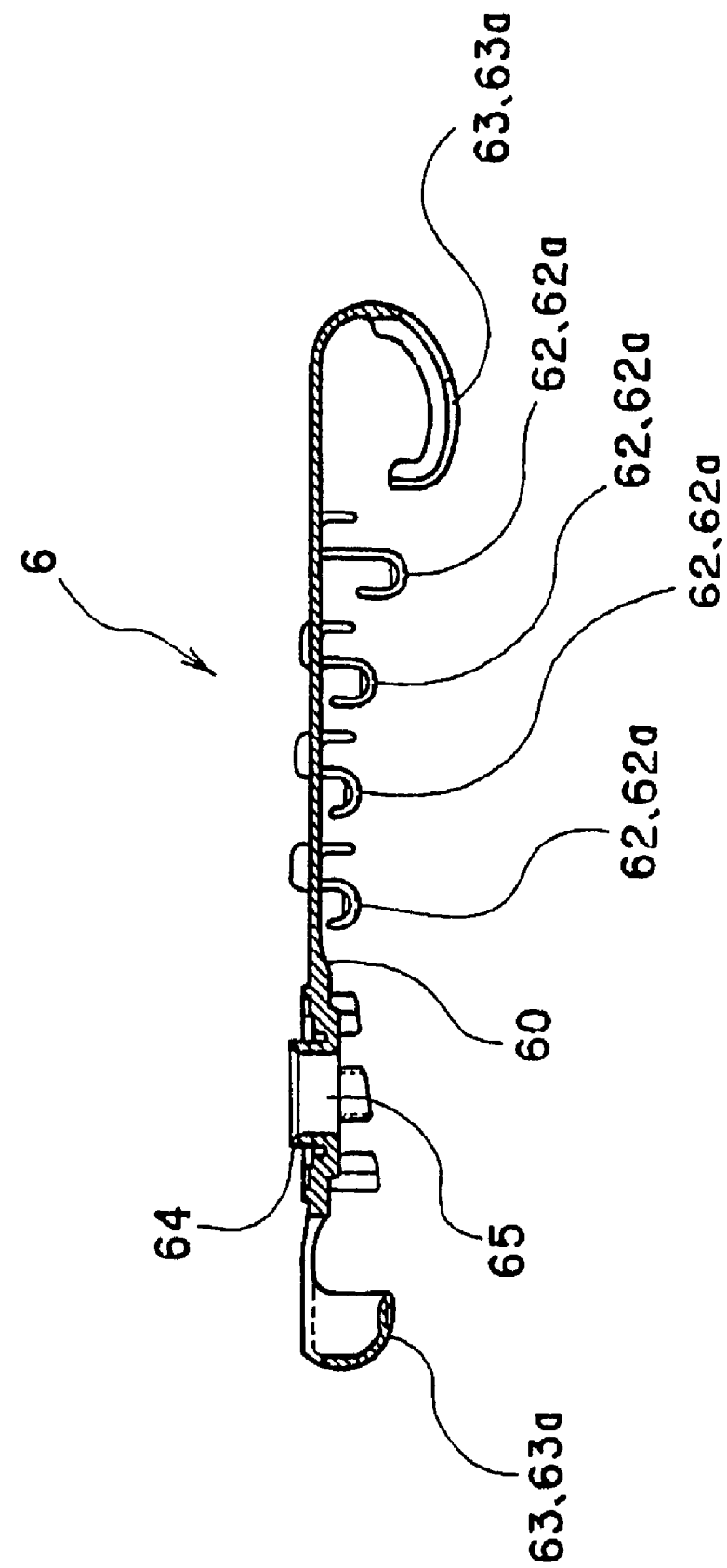
FIG. 9 is a sectional view of the spacing member.
Figure 10:
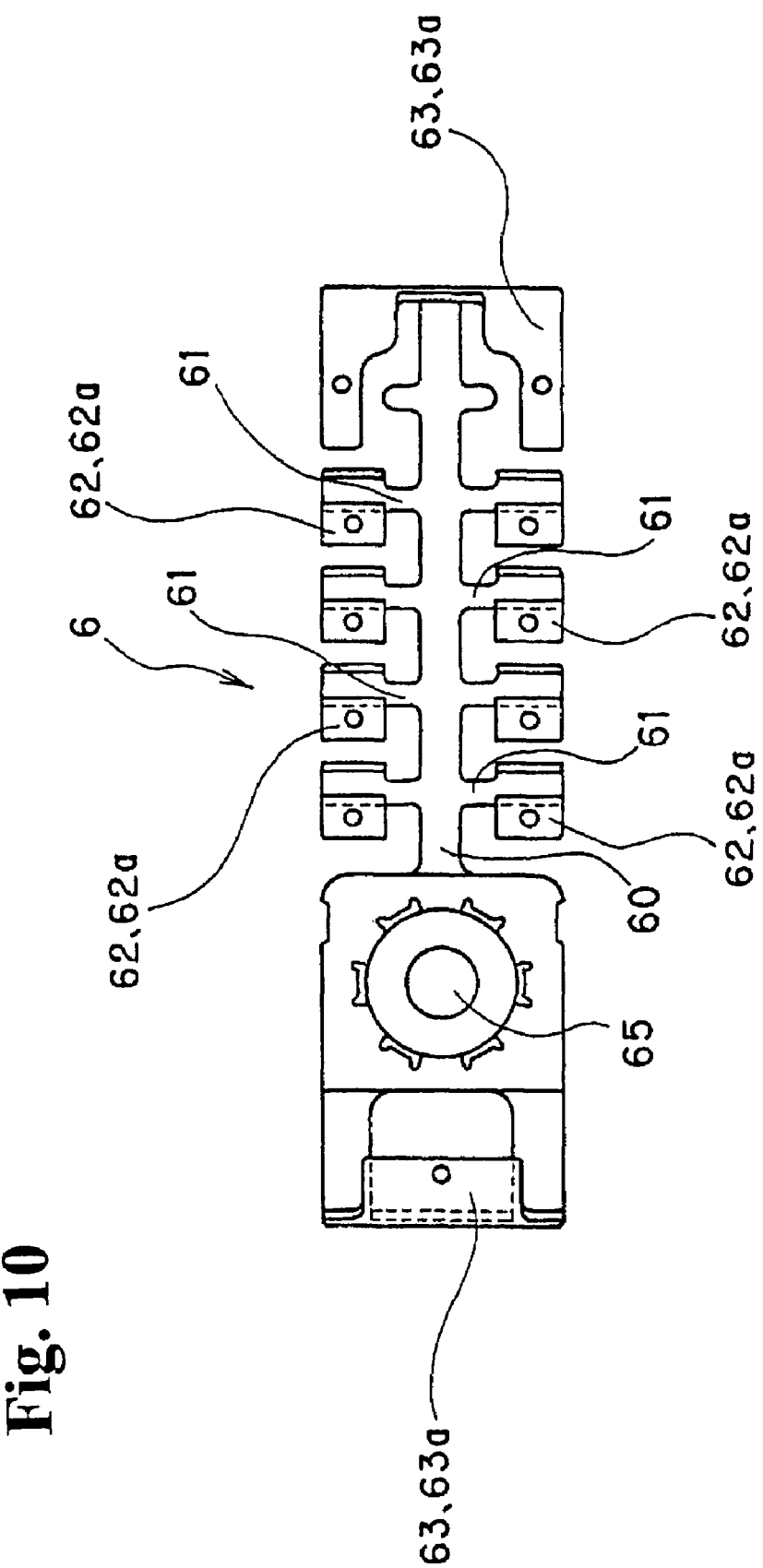
FIG. 10 is a bottom plan view of the spacing member.
Figure 11:
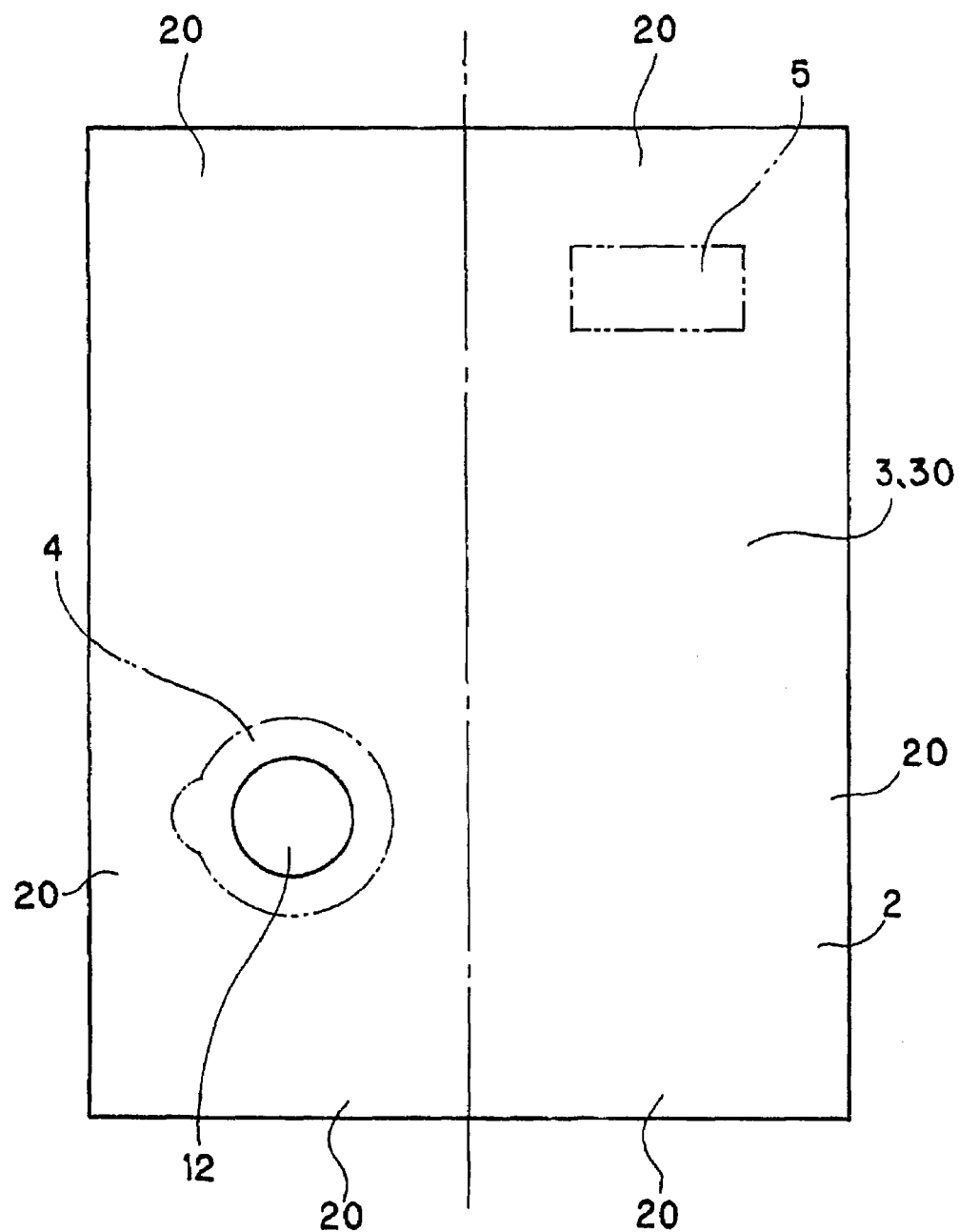
FIG. 11 is a developed view showing a filter base material.

More specifically, FIG. 1 shows the filtering device F according to the first embodiment of the invention seen from above, and FIG. 2 shows a state that the filtering device F is in use, in which the filtering device F is shown in a sectional view. Also, FIG. 3 shows the filtering device F seen from a right side in FIG. 2. FIG. 4A shows an enlarged sectional view of a filter body 1 of the filtering device F, and FIG. 4B shows an enlarged sectional structure of another example of the filter body of the filtering device F. Also, FIG. 5 to FIG. 7 show a cylindrical socket body 4 forming the filtering device F, and FIG. 8 to FIG. 10 show a spacing member 6. Further, FIG. 11 shows a filter base material 2, which is shown in a developed view to explain an insert-molding method where the developed base material 2 is placed in a metallic mold to mold the cylindrical socket body 4 and a contact section 5. In FIG. 11, the cylindrical socket member 4 and the contact section 5 are placed in a mold at positions shown by phantom lines tracing contours of the respective members. A projected line in FIG. 11 indicates a folding line of the filter base material 2 for forming the filter body 1 in a bag shape from the filter base material 2 after the insert molding described above.

Figure 12:
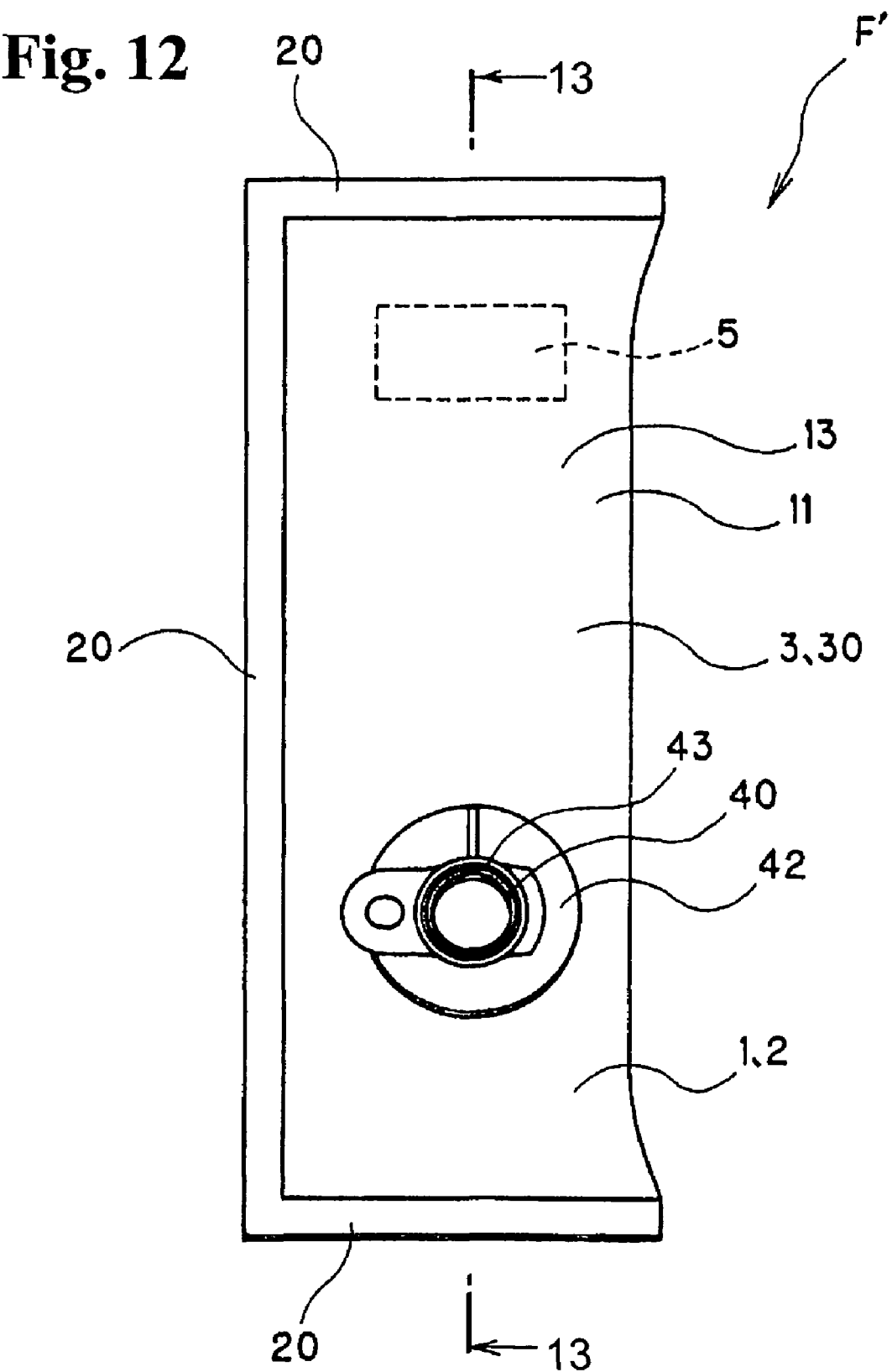
FIG. 12 is a plan view of a filtering device according to the second embodiment of the invention.
Figure 13:
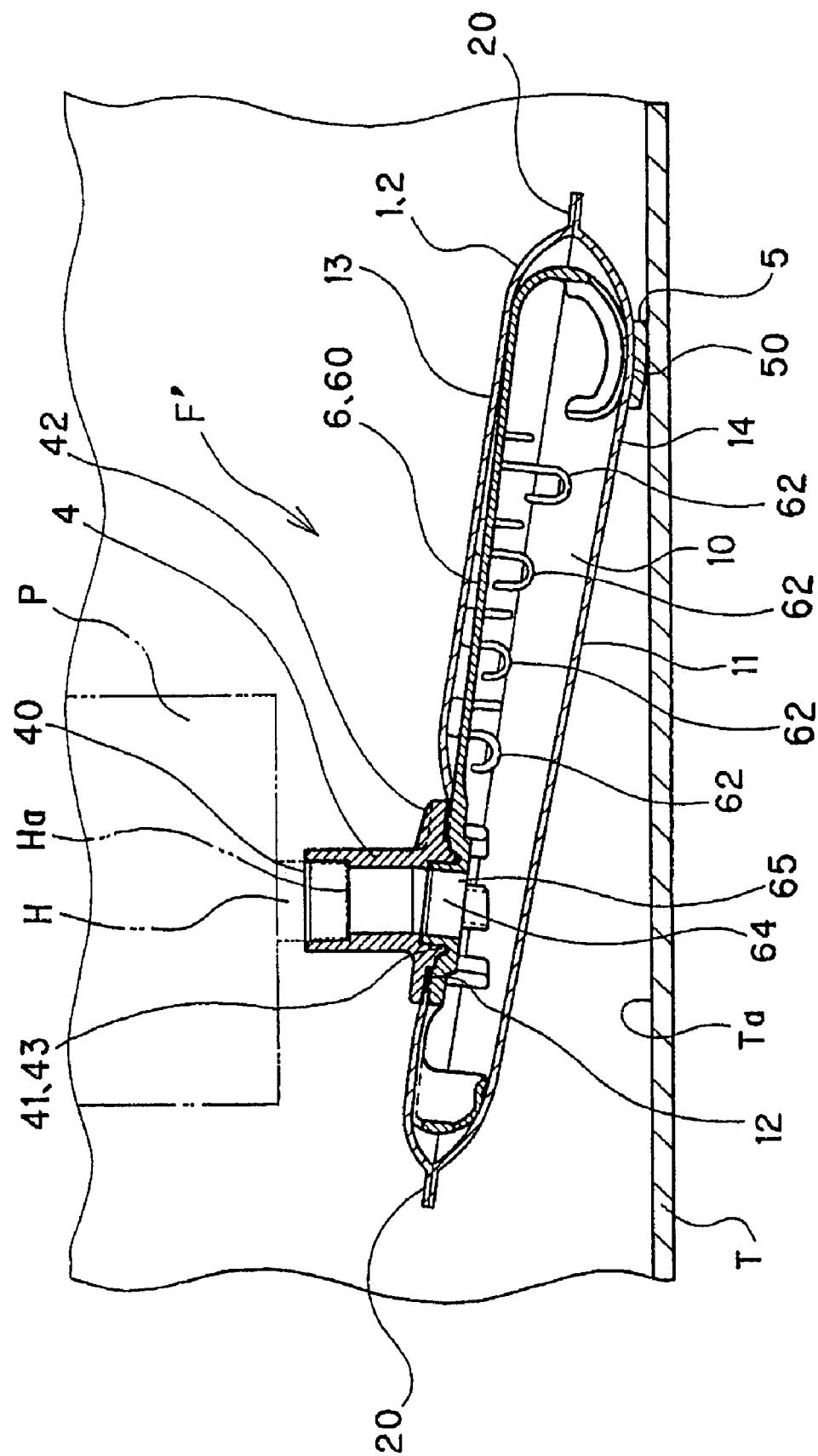
FIG. 13 is a sectional view of the filtering device taken along line 13-13 in FIG. 12 in a state that the filtering device is in use.
Figure 14:
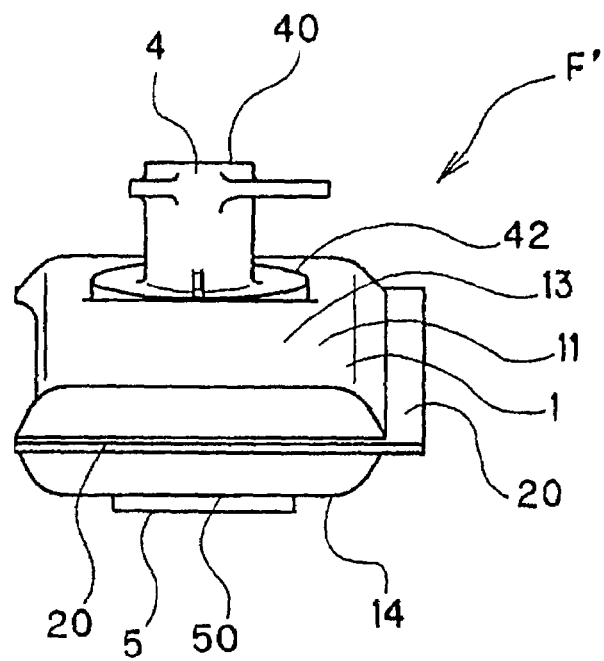
FIG. 14 is a side view of the filtering device of the second embodiment of the invention.
Figure 15:
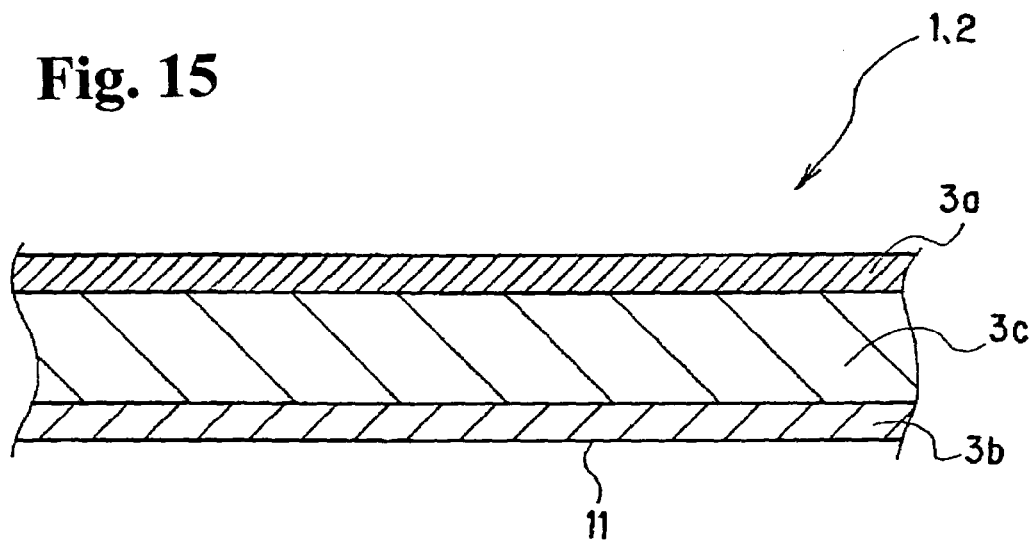
FIG. 15 is an enlarged sectional view of a filter body in the filtering device of the second embodiment.

FIG. 12 shows the filtering device F' according to the second embodiment of the invention seen from above, and FIG. 13 is a sectional view of the filtering device F' in a state that the filtering device F' is in use. FIG. 14 shows the filtering device F' seen from a right side in FIG. 13. Further, FIG. 15 shows an enlarged sectional structure of a filter body 1 of the filtering device F'.

First, the first embodiment shown in FIG. 1 to FIG. 11 will be explained. The filtering device F according to the first embodiment of the invention is attached to a fuel suction port Ha disposed inside a fuel tank T, to thereby remove water and foreign materials in fuel transferred to an internal combustion engine through the fuel suction port Ha.

Typically, the filtering device F is attached to the fuel suction port Ha of a suction pipe H inside the fuel tank T. The fuel is transferred to the internal combustion engine side through the fuel suction port Ha by a fuel pump P disposed inside the fuel tank T, or by a fuel pump disposed outside the fuel tank T.

The filtering device F includes the fuel body 1 formed in a bag shape. The filtering device F is attached to the fuel suction port Ha such that an inner space 10 of the bag shape fuel body 1 communicates with the fuel suction port Ha.

Also, the filtering device F includes the spacing member 6, which is arranged inside the filter body 1 to keep the filter body 1 in an inflated bag shape.

Further, the filter body 1 includes an upper surface section 13 and a lower surface section 14, and at least the lower surface section 14 of the filter body 1 includes an inner layer 3a formed of a mesh or mesh member, and an outer layer 3b formed of a non-woven fabric as shown in FIG. 4A. The mesh forming the inner layer 3a can be formed of an extruded mesh or a woven mesh.

In the case that the mesh is formed of a woven mesh, typically, a synthetic fiber, such as a nylon fiber, a polyethylene fiber, or a polypropylene fiber, is woven into a mesh fine enough for separating water. The woven mesh can be formed by a weave for forming Japanese Tatami mat, a plain weave, a twill weave, or a satin weave.

Also, the non-woven fabric forming the outer layer 3b is structured to efficiently remove the foreign materials in the fuel. Typically, the non-woven fabric is formed of a synthetic fiber, such as a nylon fiber, a polyethylene fiber, or a polypropylene fiber, and is formed of a mat or a sheet through various methods, such as a span bond and a melt blown.

In the example shown in FIG. 1 to FIG. 11, both the mesh and the non-woven fabric are formed of the synthetic fiber. Also, each of the upper surface section 13 and the lower surface section 14 includes the inner layer 3a formed of the mesh and the outer layer 3b formed of the non-woven fabric.

A sheet of the filter base material 2 including the inner layer 3a and the outer layer 3b is folded in half such that the inner layer 3a is located inside. At the same time, rim portions 20 of the filter base material 2, which face each other at portions other than the folded side of the filter base material 2, are bonded to each other to thereby form the filter body 1 in the bag shape. Typically, an ultrasonic welding or a vibration welding is used to bond the rim portions 20 of the filter base material 2.

The inner layer 3a and the outer layer 3b respectively may include fibers formed of the same synthetic resin, so that both the layers 3a, 3b can be bonded together at the welded portions by the aforementioned welding method.

Alternatively, before the filter base material 2 is formed into a bag shape, the inner layer 3a and the outer layer 3b may be spot-welded at portions other than the rim portions 20 of the filter base material 2 as described above. Accordingly, an unnecessary space between the layers 3a and 3b is eliminated.

Other than the example shown in the drawings, two sheets of the filter base materials 2, which include the inner layer 3a and the outer layer 3b, may be bonded at the rim portions 20 to form the bag shape filter body 1.

In the filtering device F including the inner layer 3a and the outer layer 3b shown in FIG. 4A, since the inner layer 3a is formed of the mesh, the spacing member 6 does not directly contact the outer layer 3b formed of the non-woven fabric. Especially, in the first embodiment, each of the upper surface section 13 and the lower surface section 14 has the inner layer 3a formed of the mesh and the outer layer 3b formed of the non-woven fabric. Therefore, the spacing member 6 does not directly contact the outer layer 3b at both the lower and upper sides of the filter body 1.

As a result, since the spacing member 6 does not slide against the outer layer 3b when the inner wall surface Ta of the lower section of the fuel tank T moves (expanding and shrinking of the fuel tank T) due to a change of the internal pressure in the fuel tank T, no fabric piece produced by fraying the fibers of the non-woven fabric is sent to the internal combustion engine side from the fuel suction port Ha, and the outer layer 3b will not be worn out with time.

Also, the outer layer 3b formed of the non-woven fabric effectively removes the foreign materials in the fuel. Accordingly, the number of the foreign materials sent into the fuel pump P is reduced, so that the life of the fuel pump P can be prolonged.

Alternatively, as shown in FIG. 4B, the filter body may be formed of two or more laminated filter layers 3. Namely, a filter body 1' is formed of a filter base material 2' formed of the two or more filter layers 3 in a bag shape.

As shown in FIG. 4B, among the filter layers 3 in the filter body 1', the filter layer 3 (hereinafter referred to as the first filter layer 30) forming an outer surface 11 of the filter body 1' can be formed of a woven mesh or woven mesh material with water separation function, and the filter layer 3 (hereinafter referred to as a second filter layer 31) adjacent to the first filter layer 30 at an inner side of the first filter layer 30 can be formed of the non-woven fabric.

The woven mesh forming the first filter layer 30 has a mesh fine enough for the water separation, and formed by a weave for forming a Tatami mat, a plain weave, a twill weave, a satin weave, and the like. Also, the woven mesh is typically formed of a synthetic fiber, such as a nylon fiber, a polyethylene fiber, or a polypropylene fiber, i.e. at least one of a nylon fiber, a polyethylene fiber and a polypropylene fiber, and has a mesh fine enough for the water separation.

Also, the non-woven fabric forming the second filter layer 31 is structured to efficiently remove the foreign materials in the fuel. The non-woven fabric is formed of a synthetic fiber, such as a nylon fiber, a polyethylene fiber, or a polypropylene fiber. The fabric is formed of a mat or a sheet through various methods, such as a span bond and a melt blown.

In the example shown in FIG. 4B, both the woven mesh and the non-woven fabric are formed of the synthetic fiber. A sheet of the filter base material 2', which has the first filter layer 30 and the second filter layer 31, is folded in half such that the second filter layer 31 is located inside. At the same time, rim portions 20 of the filter base material 2', which face each other at portions other than the folded side of the filter base material 2', are bonded together to thereby form the filter body 1' in the bag shape. Typically, the rim portions 20 of the filter base material 2' are bonded by an ultrasonic welding or a vibration welding.

Also, the synthetic fibers forming the first filter layer 30 and the synthetic fibers forming the second filter layer 31 may be formed of the same type of synthetic resin, so that the filter layers 30, 31 can be bonded together at the welded portions by the aforementioned welding.

Alternatively, before the filter base material 2' is formed into a bag shape, the first filter layer 30 and the second filter layer 31 may be spot-welded at portions other than the rim portions 20 of the filter base material 2' as described above. Accordingly, an unnecessary space between the filter layers 30, 31 is eliminated.

Other than the example shown in the drawings, two sheets of the filter base materials 2', which include the first filter layer 30 and the second filter layer 31, may be bonded together to form the filter body 1 in the bag form.

Also, as shown in FIG. 4B, the third filter layer 32 formed of a non-woven fabric is provided at an inner side of the second filter layer 31, and the third filter layer 32 is also able to remove the foreign materials in the fuel.

In the filtering device F including the first filter layer 30 and the second filter layer 31 shown in FIG. 4B, the first filter layer 30 is formed of the woven mesh with a mesh fine enough for separating water. Thus, as opposed to the case that the first filter layer 30 is formed of the extruded mesh made of the synthetic resin, water is much more securely prevented from entering into the inner space 10 of the filter body.

Also, the second filter layer 31, which is formed of the non-woven fabric adjacent to the first filter layer 30 at the inner side of the first filter layer 30, can remove the foreign materials in the fuel, which have passed through the first filter 30. Therefore, the number of the foreign materials into the fuel pump P is reduced, so that the life of the fuel pump P can be prolonged.

Figure 4C:
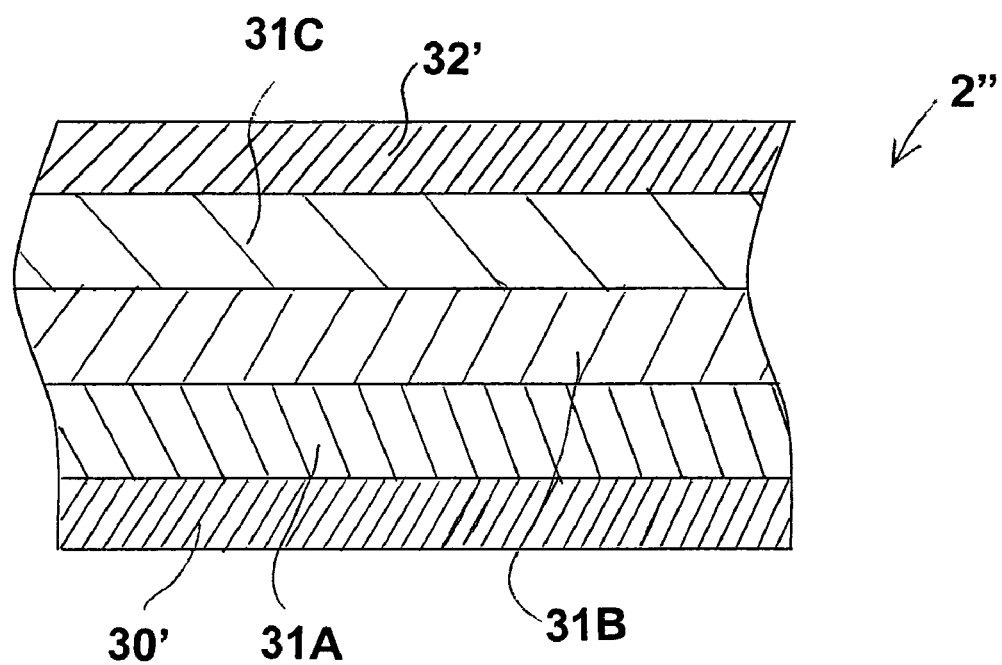
FIG. 4C is an enlarged sectional view of a further filter body.

Alternatively, as shown in FIG. 4C, a filter base material 2" is formed of three or more filter layers in a bag shape. The filter base material 2" has an outside filter layer 30' and an inside filter layer 32' formed of a non-woven fabric. Additionally, the filter base material 2" has an intermediate filter layer formed of three intermediate filter layers 31A to 31C between the outside filter layer 30' and the inside filter layer 32'.

The outside filter layer 30' is formed of a woven mesh cloth with about 70 mesh size small enough for separating water, and formed of a Tatami weave, a plain weave, a twill weave, a satin weave, and the like. The woven mesh is typically formed of a synthetic fiber such as a polypropylene fiber with a diameter of about 180 μm.

The inside filter layer 32' is formed of a span bond non-woven fabric with an areal density of 80 $g/m^2$ for efficiently removing foreign materials in the fuel. The span bond non-woven fabric is formed of a synthetic fiber such as a polypropylene fiber with a diameter of about 20 μm. The inside filter layer 32' provides strength to the filter base material 2' and protects the intermediate filter layer.

The intermediate filter layer is formed of the three intermediate filter layers 31A to 31C. The intermediate filter layer 31A is arranged adjacent to the outside filter layer 30', and is formed of a melt blown non-woven fabric with an areal density of 40 $g/m^2$. The melt blown non-woven fabric of the intermediate filter layer 31A is formed of a synthetic fiber such as a polypropylene fiber with a diameter of about 7 μm.

The intermediate filter layer 31B is arranged adjacent to the intermediate filter layer 31A, and is formed of a melt blown non-woven fabric with an areal density of 30 $g/m^2$. The melt blown non-woven fabric of the intermediate filter layer 31B is formed of a synthetic fiber such as a polypropylene fiber with a diameter of about 5 μm.

The intermediate filter layer 31C is arranged between the intermediate filter layer 31B and the inside filter layer 32', and is formed of a melt blown non-woven fabric with an areal density of 40 $g/m^2$. The melt blown non-woven fabric of the intermediate filter layer 31C is formed of a synthetic fiber such as a polypropylene fiber with a diameter of about 3 μm.

As described above, the filter base material 2" is formed of the outside filter layer 30', the inside filter layer 32', and the three intermediate filter layers 31A to 31C between the outside filter layer 30' and the inside filter layer 32'. Accordingly, the outside filter layer 30' provides wear resistance against a bottom surface of the fuel tank, and the inside filter layer 32' protects the intermediate filter layer and provides sufficient weld strength. Further, the intermediate filter layers are formed such that the fiber diameters decrease toward the inside filter layer 32'. Accordingly, it is possible to effectively prevent clogging while maintaining sufficient filtering performance.

In the filter base material 2" shown in FIG. 4C, the outside filter layer 30', the inside filter layer 32', and the intermediate filter layers are formed of polypropylene fibers. Accordingly, it is possible to obtain sufficient water separation and securely bond all of the filter layers together at a welded portion with welding. A polypropylene fiber has excellent swelling property relative to fuel, thereby making it easy to control and maintain mesh size.

Further, in the first embodiment of the invention, the filtering device F includes a cylindrical socket body 4 having an end portion 40 connected to the fuel suction port Ha and an end portion 41 connected to a communication hole 12 formed in the filter body 1.

More specifically, in the first embodiment of the invention, the cylindrical socket body 4 is formed as a cylindrical body in which both the end portions 40, 41 are opened. The cylindrical socket body 4 is integrally formed with the filter body 1 such that the cylindrical socket body 4 constitutes one end of the filter body 1 having a substantially rectangular shape in a plan view, and the other end portion 41 communicating with the communication hole 12 formed in the upper surface section 13 of the filter body 1.

In the first embodiment of the invention, the cylindrical socket body 4 includes an outer flange 42 around a cylindrical axis of the cylindrical socket body 4 at the other end portion 41 side. In the cylindrical socket body 4, a portion between the outer flange 42 and an opening rim of the other end portion 41 of the cylindrical socket body 4 constitutes an insertion section 43 to be inserted into the communication hole 12 of the filter body 1. At the same time, in a state that a flange surface of the outer flange 42 is integrally connected to the outer surface 11 of the filter body 1, the insertion section 43 is inserted inside the filter body 1. Accordingly, the filtered fuel entering into the inner space 10 of the filter body 1 is guided to the fuel suction port Ha side. As a result, in the first embodiment of the invention, by connecting the end portion 40 of the cylindrical socket body 4 to the fuel suction port Ha, the filtering device F can be properly attached to the fuel suction port Ha.

In the first embodiment, since the cylindrical socket body 4 is provided at one end of the filter body 1 as described above, the filter body 1 is provided in an inclined form inside the fuel tank T such that the filter body 1 gradually approaches the fuel suction port Ha from the other end toward the one end thereof provided with the cylindrical socket body 4, and the lower surface section 14 of the filter body 1 at the other end contacts the inner wall surface Ta of the lower section of the fuel tank T as shown in FIG. 2.

Also, in the first embodiment, the cylindrical socket body 4 is molded by an insert molding, in which the filter base material 2 before connected to the rim portions is inserted. More specifically, when the cylindrical socket body 4 is formed by the insert molding, the insertion section 43 is located in the communication hole 12 in a state that the filter base material 2 provided with the communication hole 12 is disposed in a mold, and the flange surface of the outer flange 42 is located closely in contact with the outer surface of the outer layer 3b of the filter base material 2.

Accordingly, in the first embodiment, the filter base material 2 and the cylindrical socket body 4, in other words, the integration of the filter body 1 formed of the filter base material 2 and the cylindrical socket body 4 can be securely connected. Also, the outer surface 11 of the lower side of the filter body 1 integrally includes the plastic contact section 5 for contacting the inner wall surface Ta of the lower section of the fuel tank T.

More specifically, in the first embodiment, the contact section 5 is integrated with the filter body 1 at the lower surface section 14 of the other end side of the filter body 1 disposed in the inclined form inside the fuel tank T as described above.

The contact section 5 has a substantially rectangular plate form elongated in a width direction of the filter body 1. In a state that an upper surface 50 of the contact section 5 is closely in contact with the lower surface section 14 of the filter body 1, the contact section 5 is integrally formed at the filter body 1.

Accordingly, in the first embodiment of the invention, the outer layer 3b forming the filter body 1 does not directly contact the inner wall surface Ta of the lower section of the fuel tank T. Thus, the outer layer 3b will not be worn out with time as the inner wall surface Ta of the lower section of the fuel tank T does not slides against the outer layer 3b when the inner wall surface Ta of the lower section of the fuel tank T moves (that is, when the fuel tank T expands or shrinks) due to the change in the internal pressure of the fuel tank T.

Also, in the first embodiment, the contact section 5 is molded by the insert molding, in which the filter base material 2 before connected is inserted.

More specifically, the contact section 5 is formed by the insert molding such that a part of the contact section 5 is closely in contact with the outer surface of the outer layer 3b of the filter base material 2 while the filter base material 2 provided with the communication hole 12 is disposed in the metallic mold.

Accordingly, in the first embodiment, the filter base material 2 and the contact section 5, in other words, the integration of the filter body 1 formed of the filter base material 2 and the contact section 5 are surely connected.

Also, in the first embodiment of the invention, the spacing member 6 is formed of (1) a principal section 60 with a length extending substantially throughout a longitudinal length of the filter body 1; (2) a plurality of branch sections 61 crossing at the principal section 60 and integrally connected to the principal section 60 at the crossing points; (3) spacing bodies 62, 63 respectively provided at a plurality of branch sections 61 and both ends of the principal section 60; and (4) a fitting section 64 to be fitted with the insertion section 43 of the cylindrical socket body 4.

More specifically, the spacing body 62 provided at each branch section 61 includes a downward projecting portion 62a projecting downwardly below each branch section 61.

A projecting end of each downward projecting portion 62a is formed in a curved shape such that the projecting end of the downward projecting portion 62a does not poke the inner surface of the filter body 1. Also, the respective branch sections 61 are formed such that positions of the projecting end surfaces of the downward projecting portions 62a become gradually higher from a side where the contact section 5 is formed toward a side where the cylinder socket body 4 is formed.

Also, the spacing bodies 63 provided at the principal section 60 project downwardly from terminal ends of the principal section 60, and are formed in a sleigh shape in which projecting ends 63a are formed in curved shapes such that upper sides thereof constitute inner sides of the curve. Further, a terminal end of each spacing body 63 faces a central side of the principal section 60.

In the first embodiment of the invention, the fitting section 64 has a rib surrounding a hole rim of a hole 65 formed in the principal section 60, in which the hole rim of the hole 65 is located at an upper surface side of the principal section 60.

The fitting section 64 is designed to be fitted to the insertion section 43 of the cylindrical socket body 4 inserted in the inner space 10 through the communication hole 12. When the fitting section 64 is fitted to the insertion section 43, the hole 65 communicates with the inside of the cylinder socket body 4 as shown in FIG. 2.

More specifically, in the first embodiment of the invention, in a state that the cylindrical socket body 4 and the contact section 5 are formed in the filter base material 2, the fitting section 43 is fitted to the insertion section 43 such that an upper surface of the spacing member 6 faces the inner layer 3a of the filter base material 2. Then, the filter base material 2 is folded in half such that the inner layer 3a is located inside. Also, the rim portions 20 of the folded filter base material 2, which face each other at portions other than the folded side of the filter base material 2, are bonded together, so that the spacing member 6 can be accommodated in the inner space 10 of the filter body 1.

Now, the second embodiment shown in FIG. 12 to FIG. 15 will be explained. The filtering device F' according to the second embodiment of the invention is attached to a fuel suction port Ha disposed inside a fuel tank T, to thereby remove water and foreign materials in fuel transferred to an internal combustion engine through the fuel suction port Ha, as in the first embodiment.

Typically, the filtering device F' is attached to the fuel suction port Ha of a suction pipe H inside the fuel tank T. The fuel is transferred to the internal combustion engine side through the fuel suction port Ha by a fuel pump P disposed inside the fuel tank T, or by a fuel pump disposed outside the fuel tank T.

The filtering device F' includes the filter body 1 formed in a bag shape. The filtering device F' is attached to the fuel suction port Ha such that an inner space 10 of the bag shape filter body 1 communicates with the fuel suction port Ha.

Also, the filtering device F' includes the spacing member 6, which is arranged inside the filter body 1 to keep the filter body 1 in an inflated bag shape.

Further, the filter body 1 includes the upper surface section 13 and the lower surface section 14, and at least the lower surface section 14 of the filter body 1 includes an inner layer 3a formed of mesh or mesh member, an outer layer 3b formed of mesh or mesh member, and an intermediate layer 3c formed of non-woven fabric as shown in FIG. 15.

The meshes forming the inner layer 3a and the outer layer 3b can be formed of an extruded mesh or a woven mesh.

In the case that the mesh is formed of a woven mesh, typically, a synthetic fiber, such as a nylon fiber, a polyethylene fiber, or a polypropylene fiber, is woven into a mesh fine enough for separating water. The woven mesh can be formed by a weave by forming Tatami, a plain weave, a twill weave, or a satin weave.

Also, the non-woven fabric forming the outer layer 3b is structured to efficiently remove the foreign materials in the fuel. Typically, the non-woven fabric is formed of a synthetic fiber, such as a nylon fiber, a polyethylene fiber, or a polypropylene fiber, and is formed of a mat or a sheet through various methods, such as a span bond and a melt blown.

In the example shown in FIG. 12 to FIG. 15, both the mesh and the non-woven fabric are formed of the synthetic fibers. Also, in this example, both the upper surface section 13 and the lower surface section 14 include the inner layer 3a formed of the mesh, the outer layer 3b formed of the mesh, and the intermediate layer 3c formed of the non-woven fabric.

A sheet of the filter base material 2 including the inner layer 3a, the intermediate layer 3c and the outer layer 3b is folded in half such that the inner layer 3a is located inside. At the same time, rim portions 20 of the filter base material 2, which face each other at portions other than the folded side of the filter base material 2, are bonded together to thereby form the filter body 1 in the bag shape. Typically, an ultrasonic welding or a vibration welding is used to bond the rim portions 20 of the filter base material 2.

The inner layer 3a, the intermediate layer 3c and the outer layer 3b respectively may include fibers formed of the same synthetic resin, so that the layers 3a, 3c, 3b can be bonded together at the welded portions by the aforementioned welding method.

Alternatively, before the filter base material 2 is formed into a bag shape, the inner layer 3a, the intermediate layer 3c and the outer layer 3b may be spot-welded at portions other than the rim portions 20 of the filter base material 2 as described above. Accordingly, an unnecessary space between the layers 3a, 3c and 3b is eliminated.

Other than the example shown in the drawings, two sheets of the filter base materials 2, which include the inner layer 3a, the intermediate layer 3c and the outer layer 3b, may be bonded at the rim portions 20 to form the bag shape filter body 1.

In the filtering device F' including the inner layer 3a, the intermediate layer 3c and the outer layer 3b shown in FIG. 15, since the inner layer 3a is formed of the mesh, the spacing member 6 does not directly contact the intermediate layer 3c formed of the non-woven fabric. Especially, in the second embodiment, both the upper surface section 13 and the lower surface section 14 has the inner layer 3a formed of the mesh, the intermediate layer 3b formed of the non-woven fabric and the outer layer 3b formed of the mesh. Therefore, the spacing member 6 does not directly contact the intermediate layer 3b at both the lower and upper sides of the filter body 1.

As a result, since the spacing member 6 does not slide against the intermediate layer 3c when the inner wall surface Ta of the lower section of the fuel tank T moves (expanding and shrinking of the fuel tank T) due to a change of the internal pressure in the fuel tank T, no fabric piece produced by fraying the fibers of the non-woven fabric is sent to the internal combustion engine side from the fuel suction port Ha, and the intermediate layer 3c will not be worn out with time.

Also, the intermediate layer 3c formed of the non-woven fabric effectively removes the foreign materials in the fuel. Accordingly, the number of the foreign materials sent into the fuel pump P is reduced, so that the life of the fuel pump P can be prolonged.

Further, the intermediate layer 3c formed of the non-woven fabric is sandwiched between the outer layer 3b and the inner layer 3c. Therefore, the outer layer 3b and the inner layer 3a maintain a shape of the non-woven fabric forming the intermediate layer 3c, so that the filter body 1 maintains the adequately inflated bag shape.

In the second embodiment of the invention, the filtering device F' includes a cylindrical socket body 4 having an end portion 40 connected to the fuel suction port Ha and an end portion 41 connected to a communication hole 12 formed in the filter body 1. The socket body 4 has the same structure and is formed with the filter body 1, as explained in the first embodiment. Therefore, the explanation thereof is omitted.

According to the structure of the filtering device of the invention, since the first filter layer is formed of the woven mesh having a fine mesh for improved water separation, water is separated more effectively in the inner space of the filter body as compared with an extruded mesh made of a synthetic resin.

Also, according to the fuel-filtering device of the invention, the inner layer of the bag shape filter body is formed of the mesh, and the layer formed of the non-woven fabric is provided outside the inner layer. Therefore, even if the spacing member arranged inside the filter body to maintain the inflated bag shape is pressed and moved when the inner wall surface of the lower section of the fuel tank moves, since the spacing member does not directly contact the layer formed of the non-woven fabric, the non-woven fabric is not worn out, and the fibers forming the non-woven fabric are not frayed. Accordingly, no fabric piece produced by fraying the fibers forming the non-woven fabric is sent to the internal combustion engine side.

The Disclosures of Japanese Patent Applications No. 2001-215668 filed on Jul. 16, 2001 and No. 2001-228295 filed on Jul. 27, 2001 are incorporated in the application.

While the invention has been explained with reference to the specific embodiments of the invention, the explanation is illustrative and the invention is limited only by the appended claims.

What is claimed is:

1. A fuel-filtering device to be disposed inside a fuel tank for filtering a fuel, comprising:
    a filter body having a bag shape and a communication hole, and being formed of a plurality of laminated filter layers, said laminated filter layers including an outside filter layer formed of a woven mesh, an inside filter layer formed of a non-woven fabric, and a plurality of intermediate filter layers disposed between the outside filter layer and the inside filter layer and formed of a melt blown non-woven fabric, said filter body being formed of at least one of a polyethylene fiber and a polypropylene fiber and having mesh sizes decreasing from the outside filter layer toward the inside filter layer,
    wherein said plurality of intermediate filter layers consists of a first intermediate filter layer arranged adjacent to the outside filter layer and having an area density of 40g/m$^2$, a second intermediate filter layer arranged adjacent to the first intermediate filter layer and having an area density of 30 g/m$^2$, and a third intermediate filter layer arranged between the second intermediate filter layer and the inside filter layer and having an area density of 40 g/m$^2$.

2. A fuel-filtering device according to claim 1, wherein said filter body is formed only of the polypropylene fiber having oilwater separation property.

3. A fuel-filtering device according to claim 2, wherein said plurality of intermediate filter layers is formed of melt blown non-woven fabrics of polypropylene fiber and has mesh sizes decreasing toward the inside filter layer.

4. A fuel-filtering device according to claim 3, wherein said outside filter layer is formed of the fiber with a diameter about 180 µm, said plurality of intermediate filterlayers is formed of the fiber with a diameter between about 3 and 7µm, and said inside filter layer is formed of the fiber with a diameter about 20 µm.

5. A fuel-filtering device according to claim 1, further comprising a plastic cylindrical socket body having one end to be connected to a fuel suction port in the fuel tank and the other end connected to the communication hole.

6. A fuel-filtering device according to claim 1, further comprising a plastic contact section disposed at a bottom of the fuelfiltering device for contacting an inner wall of the fuel tank.

7. A fuel-filtering device according to claim 5, wherein said filter body is formed of two sheet sections as a filter base material made at least of said two laminated filter layers, said two sheet sections of the filter base material being bonded together at rim portions thereof to thereby form the bag shape, said two sheet sections of the filter body being formed of two separate sheets or one sheet folded in half, said cylindrical socket body being a part molded by an insert molding in which the filter base material is inserted in a mold before the rim portions are bonded.

8. A fuel-filtering device according to claim 6, wherein said filter body is formed of two sheet sections as a filter base material made at least of said two laminated filter layers, said two sheet sections of the filter base material being bonded together at rim portions thereof to thereby form the bag shape, said two sheet sections of th6 filter body being formed of two separate sheets or one sheet folded in half, said plastic contact section being a part molded by an inset molding in which the filter base material is inserted in a mold before the rim portions are bonded.

9. A fuel-filtering device according to claim 1, further comprising a spacing member arranged inside of the filter body to maintain the bag shape.

10. A fuel-filtering device according to claim 1, wherein said first intermediate filter layer is made of a polypropylene filter with a diameter of about 7 µm, said second intermediate filter layer is made of a polypropylene fiber with a diameter of about 5 µm, and said third intermediate filter layer is made of a polypropylene fiber with a diameter of about 3 µm.

* * * * *